Patented Apr. 26, 1927.

1,625,852

UNITED STATES PATENT OFFICE.

WILLY O. HERRMANN AND HANS DEUTSCH, OF MUNICH, GERMANY, ASSIGNORS TO CONSORTIUM FUR ELECKTROCHEMISCHE INDUSTRIE, OF MUNICH, GERMANY.

PROCESS FOR THE MANUFACTURE OF LINOXINLIKE SUBSTANCES.

No Drawing. Application filed June 13, 1925, Serial No. 36,941, and in Germany June 18, 1924.

Our invention relates to the production of condensation products of artificial resins and their application.

We have shown in our copending application #654,029 filed July 26, 1923, that nonphenolic aldehyde resins can be improved by adding to them organic hydroxy acid compounds such as dioxystearic acid, ricinoleic acid, dioxyabietnic acid, salicylic acid and the like; or instead of the hydroxy acids themselves we have shown that their derivatives or mixtures with other compounds may be used as, for example, castor oil. These resins after this treatment have an improved elasticity, solubility and fusibility and sometimes a lighter color. The amount of hydroxy acid to be used cannot be definitely set since the amount of acid is varied to produce the desired product such as for a lacquer, varnish, polishing and insulating means and the like. Thus we may use a weight of acid equal to half of the weight of aldehyde resin or we may use more or less hydroxy acid to produce products of plasticity varying accordingly.

We have found that the addition of the hydroxy acid materials can be made at any stage of the production of the product. For example we may add the hydroxy acid to the resin product obtained after treating aldehydes with the condensing agent such as a caustic solution; or we may add the hydroxy acid to the mix during the condensation of the aldehyde, or it can be added with the condensing material. The hydroxy acids advantageously employed in the latter processes are for example, ricinoleic acid, dioxystearic acid, phenyloxyacetic acid, etc. We have also been able to use the esters of these acids, or mixtures of the acids or esters with other materials, such as found in grape seed oil or castor oil. In this way we make use of mixtures which are lower in cost than the pure hydroxy compounds.

In certain cases we have found it highly advantageous to submit the hydroxy acid or hydroxy acid containing material to a preliminary chemical or thermal treatment or both before the addition to the aldehyde resin; for example, oxidation by a stream of air and heating or treatment with ozone. The resinous materials thus obtained are suitable for many purposes. They may be used alone as indicated in our copending application, cited above, as lacquers, varnishes, polishing, and insulating means and the like, or as adhesive compounds as shown in our copending application #732,572 filed August 16, 1924. They may be further used in admixture with other solid, semi-liquid or liquid filling materials as for example wood flour or fibre, leather scrap, jute or hemp fibres and other fibrous or cellular materials; rubber, lampblack, mineral powders such as lithopone, whiting and the like; dyes, colors or lakes, powdered horn or bone, colophonium, resins or gums, etc. in accordance with the particular uses for which it is intended. We have found that the presence or addition of certain organic substances to the mass before or during compounding may afford a favorable change, such as a softening action. These additions impart valuable properties in rendering the finished production more elastic. Such organic bodies are in particular oils, such as China wood oil, linseed oil, turpentine and the like, also other organic materials as hexalin, (cyclo-hexanol), methyl hexalin, tetralin, (tetra-hydro-naphthalene), thio-diglycol, glycerin and the like. The addition of these latter bodies hexalin and the like allow the use of less of the hydroxy acid mentioned above.

We have found that the nonphenolic aldehyde resins when thus treated with hydroxy acids, compounds of hydroxy acids or mixtures containing them with or without the addition of other waxes, resins, oils and the like, as mentioned above are changed into products which have properties similar to linoxin in that they can be utilized in the manufacture of linoleums. Further, these products by the admixture of selected filling material can be utilized in the production of artificial leathers, molding of artificial wood products, preparation of artificial cork, horn, ivory, etc.

Example I.

Butyric aldehyde is condensed in a known method by employing a sodium hydroxide solution forming an artificial resin having a softening point of about 100° C. 100 parts of the artificial resin thus prepared is melted at 120–130° C. with 70 parts by weight of dioxystearic acid. Into this linoxin like mass is now stirred 50 parts lamp black, 30 parts wood flour and 10 parts ocher and the whole stirred till uniform. This resulting plastic mass can now be hot pressed at about 100° C. to any desired form. The cooled cast, for example, a picture frame, resembles ebony and, like it, can be mechanically worked, polished, etc.

*Example II.*

A resin having a softening point of 40–45° C. is prepared by the incomplete condensation of acetaldehyde with sodium hydroxide. 100 parts of this resin is melted with 85 parts of castor oil and the condensation of the unfinished resin is carried on in the presence of the castor oil by heating for 16 hours at 200° C.

100 parts of the mass thus obtained is kneaded thoroughly at 120–130° with 30 parts ground ocher and 15 parts cork flour. This plastic is now hot calendered in the usual manner on a jute cloth base. This produces a "linoleum" with a tenacious, smooth, elastic, and water resistant surface.

*Example III.*

100 parts of the soft resin prepared as in example II is mixed with 50 parts of a resin composition which is composed of 40 parts colophonium and 10 parts copal, any undissolved matter being removed by filtration. This forms a new linoleum cement which is mixed with filler and applied as in Example II. A linoleum results which has as good a ductility as the product of II, is harder and cheaper.

*Example IV.*

Castor oil is treated by adding 1% manganese resinate, heating to 200° C., and blowing air through for 10 hours. 100 parts aldol and 28 parts of the treated castor oil are mixed, and condensation effected by sodium hydroxide solution. The resulting resin is hardened to a softening point of about 100° C. by heating for a considerable time at 200° C. This resin is then treated at 150° C. with 28 parts methyl hexalin after which 50 parts of a resin composition of 40 parts colophonium and 10 parts copal is added.

100 parts of the resin mass thus obtained is mixed at about 120° C. with 50 parts cork flour and 50 parts of 0.5 to 1 mm. diameter cork grains. This plastic mass is pressed into molds and a compact elastic product obtained which serves as cork substitute.

In a similar manner by using horn waste, ebony waste, etc. a substitute for the natural product is obtained.

*Example V.*

A resin having a softening point of 50–60° C. is prepared by partially condensing crotonaldehyde by means of water-alcohol-sulphuric acid mixture. 100 parts of this material is treated with 90 parts ricinoleic acid and condensation completed by heating at 200° C. for some time. To this melt is added 7 parts thio-diglycol and 50 parts of a resin obtained by mixing 5 parts glycerine, 20 parts copal and 30 parts colophonium.

100 parts of the resulting linoxin like mass is kneaded at about 120° C. with 50 parts ground leather, 10 parts lithopone and 8 parts short hemp fibres. This mix is spread on a coarse textile fabric and hot calendered thus obtaining an artificial leather.

These illustrations are but a few of the many varied products which we can make and we do not wish to be restricted in any way to these specific processes, proportions or added filler ingredients or resins.

The term "hot pressing" as used throughout our claims is intended to indicate molding under heat and pressure, rolling into sheets by means of heated rolls, or stamping with hot dies.

What we claim is:

1. A product of manufacture obtained by heating resinous aldehyde condensation products with organic hydroxy acid compounds, incorporating a filling material therewith and hot pressing to form the desired article.

2. A product of manufacture obtained by heating resinous aldehyde condensation products with organic hydroxy acid compounds, incorporating a softening material therewith and hot pressing to form the desired article.

3. A product of manufacture obtained by heating resinous aldehyde condensation products with organic hydroxy acid compounds, incorporating another resin therewith and hot pressing to form the desired article.

4. A product of manufacture obtained by heating resinous aldehyde condensation products with organic hydroxy acid compounds, incorporating a filling material, another resin and softening material therewith and hot pressing to form the desired article.

5. A product of manufacture which is formed by hot pressing the resinous material obtained by heating resinous aldehyde condensation products with organic hydroxy acid compounds in the presence of an organic oil or solvent.

6. A product of manufacture obtained by heating resinous aldehyde condensation products with organic hydroxy acid compounds, incorporating a filling material and an organic oil or solvent therewith and hot pressing to form the desired article.

7. A product of manufacture obtained by heating resinous aldehyde condensation products with organic hydroxy acid compounds, incorporating a filling material another resin and an organic oil or solvent therewith and hot pressing to form the desired article.

8. A product of manufacture formed by hot pressing the resinous material obtained by heating resinous aldehyde condensation products with oxygen treated organic hydroxy acid compounds.

9. A product of manufacture obtained by heating resinous aldehyde condensation products with oxygen treated organic hydroxy acid compounds, incorporating a filling material therewith and hot pressing to form the desired article.

10. A product of manufacture obtained by heating resinous aldehyde condensation products with oxygen treated organic hydroxy acid compounds, incorporating a filling material and a softening agent therewith and hot pressing to form the desired article.

11. A product of manufacture which is formed by hot pressing the resinous material obtained by heating resinous aldehyde condensation products with thermally treated organic hydroxy acid compounds in the presence of an organic oil or solvent.

12. A product of manufacture obtained by heating resinous aldehyde condensation products with thermally treated organic hydroxy acid compounds, incorporating a filling material, and an organic oil or solvent therewith and hot pressing to form the desired article.

13. A product of manufacture obtained by heating resinous aldehyde condensation products with thermally treated organic hydroxy acid compounds, incorporating a filling material, another resin, and an organic oil or solvent therewith and hot pressing to form the desired article.

14. A product of manufacture consisting in a linoxin like material obtained by condensation of an aliphatic aldehyde, mixing the condensed material with castor oil, heating the mixture and then hot pressing to form the desired article.

15. A product of manufacture consisting in a linoxin like material obtained by condensation of an aliphatic aldehyde, mixing the condensed material with castor oil, heating the mixture, incorporating ground ocher and cork flour and finally hot pressing to form the desired article.

16. A product of manufacture consisting in an artificial cork composition obtained by condensing an aliphatic aldehyde, mixing the condensed material with oxygen treated castor oil, heating till a desired plasticity is obtained, mixing this with hexalin, copal and colophonium, incorporating ground cork and finally hot pressing to form the desired article.

17. A product of manufacture consisting in a molded composition obtained by condensing an aliphatic aldehyde, adding castor oil to the condensed material heating till a desired plasticity is obtained, mixing with other resins and fillers and finally hot pressing to form the desired article.

Signed at Perth Amboy, N. J., in the county of Middlesex and State of New Jersey, this thirteenth day of May A. D. 1925.

WILLY O. HERRMANN.

Signed at Munich, in the county of Bavaria and State of Germany, this 27th day of May A. D. 1925.

HANS DEUTSCH.